(12) United States Patent
Fan

(10) Patent No.: US 7,021,593 B1
(45) Date of Patent: Apr. 4, 2006

(54) VACUUM SUCTION APPARATUS

(76) Inventor: Eagle Fan, No. 133, Cheng-Kung 6 St., Chu-Pei City, Hsinchu Hsien (TW)

( * ) Notice: Subject to any disclaimer, the term of this patent is extended or adjusted under 35 U.S.C. 154(b) by 0 days.

(21) Appl. No.: 10/972,666

(22) Filed: Oct. 26, 2004

(51) Int. Cl.
*F16B 47/00* (2006.01)

(52) U.S. Cl. ............... 248/206.2; 248/292.12

(58) Field of Classification Search ............ 248/205.5, 248/205.6, 205.7, 205.8, 206.1, 206.2, 292.12
See application file for complete search history.

(56) References Cited

U.S. PATENT DOCUMENTS

| | | | | |
|---|---|---|---|---|
| 2,527,899 A | * | 10/1950 | Otakar | 248/206.1 |
| 3,020,017 A | * | 2/1962 | Watson | 248/205.8 |
| 3,082,988 A | * | 3/1963 | Holden | 248/205.8 |
| 4,580,751 A | * | 4/1986 | Panzer | 248/205.8 |
| 4,813,640 A | * | 3/1989 | Perentin | 248/205.8 |
| 4,883,282 A | * | 11/1989 | Wolf et al. | 280/43.24 |
| 5,779,205 A | * | 7/1998 | Ching | 248/205.8 |
| 6,572,060 B1 | * | 6/2003 | Yoon | 248/163.1 |

\* cited by examiner

*Primary Examiner*—Korie Chan
(74) *Attorney, Agent, or Firm*—Rabin & Berdo, P.C.

(57) ABSTRACT

A vacuum suction apparatus with adjustment lever is disclosed. The structure of the vacuum suction apparatus includes a suction cup and a wheel base, which has a receptacle being attached by the suction cup from underneath, a semi-circular cogwheel being fixed on top of the receptacle, and an adjustment lever pivotally connected through an opening. The adjustment lever has a pinion on the bottom end, where the gearing of the pinion is to fit against corresponding gearing on the vertically erected rack at the center when the lever is in locked position. The upper portion of the lever also has a suction lock/release that allows the user to manually adjust the angle of the lever by pegging onto scooped cogwheel with a slider, so the suction strength can be adjusted desirably for continuously holding onto the same spot in extended use.

6 Claims, 5 Drawing Sheets

VACUUM SUCTION APPARATUS

BACKGROUND OF THE INVENTION

1. Field of the Invention

The present invention relates to a vacuum suction apparatus, and particularly to a suction cup with an innovative lever that allows a user to manually adjust the suction strength of the suction cup for continuously holding onto the same spot in extended use.

2. The Related Arts

Suction cups, also known as vacuum cups, are now well used by office and household users, as a suction cup can be used to hold an article easily and elegantly on a smooth vertical surface, especially on tile or glass surfaces. Further, it does not leave holes or residue on the original surface after its removal, unlike conventional wall nails or adhesive fasteners. Suction cups are now widely used for making soap holders, razor holders, radar detector holders, sign holders, etc., which are only a few of the common uses.

Suction is a force that is derived from atmospheric pressure when air is drawn out from an enclosed space forcing two surfaces to stick together. It is found that a suction cup will normally experience fatigue and deformation after extended use, resulting in gradual loss of elasticity and suction strength. This is the main reason why suction cups tend to fall off after using them for some time. However, with a uniquely designed adjustment lever, the suction force of the suction cup can be desirably adjusted by the user to effectively prolong the product life.

Also, this type of suction cup shall be able to find new applications in automobiles. At the present, most mobile phone or PDA holders for automobiles are made with a clipper that is to be attached onto the outlet of the air conditioning or the cigarette lighter in an automobile. Such clipper does not fit on all automobiles, as some are better suited than others. The truth is that the driver shall be able to watch the display screen of the electronic device with ease while still driving the automobile. If the mobile phone or PDA can be attached onto the wind shield glass of the automobile with a suction cup and suitably adjusted for viewing angle, the driver does not have to be strained in order to watch the display screen below the dash board, where the conventional holders of mobile phones or PDAs are installed, so the drivers will not be distracted from driving in the future.

SUMMARY OF THE INVENTION

A primary objective of the present invention is to provide a vacuum suction apparatus with a unique adjustment lever. The vacuum suction apparatus comprises a suction cup and a wheel base over the suction cup, where the wheel base has a receptacle being attached by the suction cup from underneath, a cogwheel being fixed on top of the receptacle, and a lever being pivotally connected through an opening, so that the suction strength of the suction cup can be manually adjusted by the user through the action of the lever for securing a reliable mounting on a smooth surface.

Another objective of the present invention is to provide a vacuum suction apparatus that enables the effective prolonging of the product life through the adjustment of the suction strength by means of an adjustment lever, whereby the adjustment lever can be initially set with a small angle, and as time progresses the adjustment angle can be gradually increased so that the suction cup can keep holding on to the same spot in extended use, that means by gradually increasing the suction strength setting the suction cup is able to counter the natural wearing down of elasticity over extended use.

A further objective of the present invention is to provide a vacuum suction apparatus that is suited for mobile phone or PDA holders in automobiles.

To achieve the above objectives, the structure of the unique suction apparatus includes a suction cup and a wheel base attached over the suction cup, where the wheel base has a semi-circular cogwheel fixed over a receptacle, and an adjustment lever is pivotally connected through a slot opening. The adjustment lever has a pinion on the bottom end, which has gearing on the outer edge that are to fit against corresponding gearing on the vertically erected rack linked to the suction cup. The top of the lever has a suction lock/release, wherein a slider is assembled that allows the adjustment angle of the lever to be manually set. With the action of the lever and the suction lock, the suction strength of the vacuum suction apparatus can be adjusted desirably for continuously holding onto the same spot in extended use.

The advantages of using the unique suction cup over the conventional suction cups are as follows: (1) High efficiency: as the suction force can be manually adjusted to prolonging the product life. (2) Alternative for conventional holders: as these suction cups, unlike conventional holders, do not leave holes or residues on the original surface after removal. (3) Add-on value: easy to use and remove.

The present invention will become more obvious from the following description when taken in connection with the accompanying drawings, which show, for purposes of illustration only, a preferred embodiment in accordance with the present invention.

DETAILED DESCRIPTION OF THE PREFERRED EMBODIMENT

Figure 1:
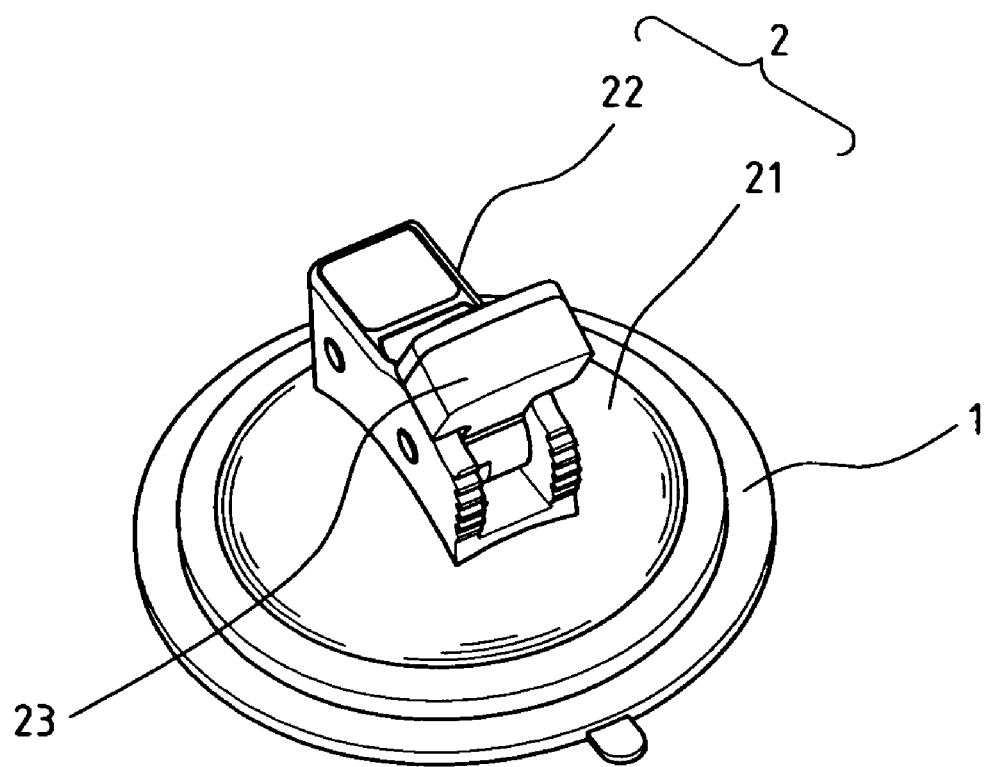
FIG. 1 is a perspective view of the present invention.
Figure 2:
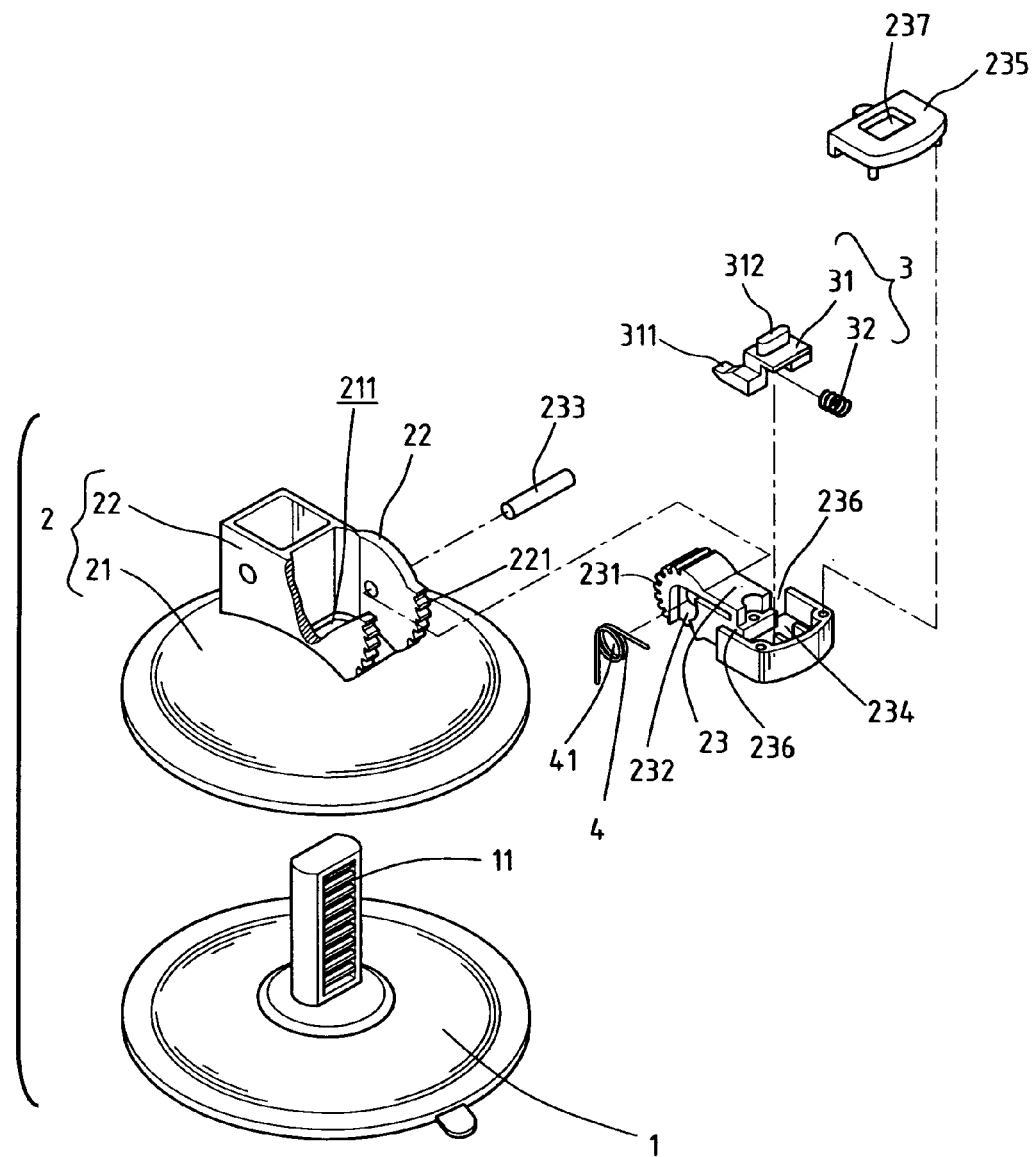
FIG. 2 is an exploded view of the unique suction cup with adjustment lever.

Referring to FIGS. 1 and 2, a vacuum suction apparatus in accordance with the present invention includes a suction cup 1, and a wheel base 2 that is installed over the suction cup 1. A rack 11 is vertically erected from the center of the suction cup 1 passing through the wheel base 2. The suction cup is formed by rubber or polyvinyl chloride (PVC) material, and the rack 11 is made out of material harder than the suction cup 1.

Figure 3A:
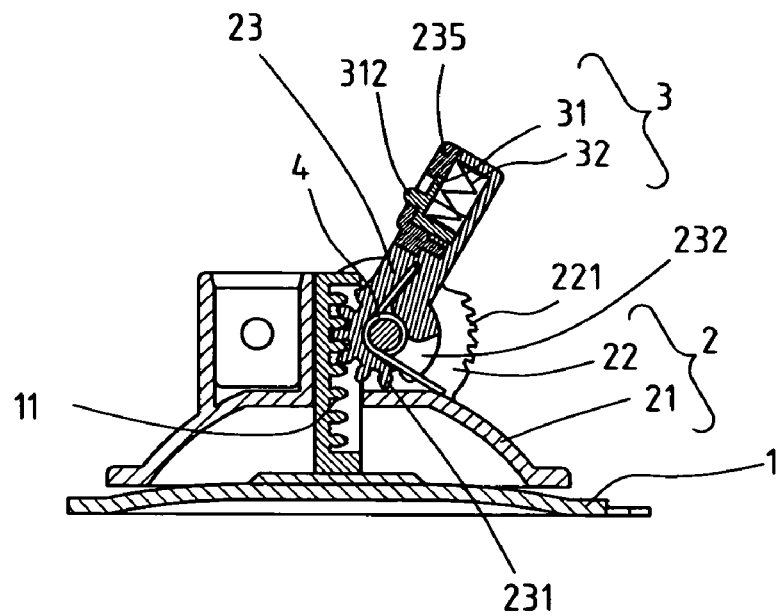
FIG. 3A is a sectional diagram of the structure of the present invention.

Referring to FIG. 3A, the wheel base 2 has a receptacle 21 attached by the suction cup 1 from underneath, a cogwheel 22 being fixed over the receptacle 21, and an adjustment lever 23 pivotally connected through a slot opening. The receptacle 21 is a circular body with a hunched back toward the center, with a slot opening 211 at the center that allows the rack 11 to pass through to the outside, also passing through the inner space of the cogwheel 22, where an adjustment lever 23 is pivotally connected having a pinion 231 on one end. Once assembled onto the cogwheel 22, the lever 23 is positioned such that a first gearing on the outer edge of the pinion 231 is locked against a second gearing on the vertical rack 11 linked to the suction cup 1. By cranking the lever 23 down toward the wheel base 2, the central part of the suction cup 1 is pulled upward to increase the suction strength.

The cogwheel 22 has multiple deep scoops 221 on the outer edges of two lateral walls. The upper portion of the lever 23 has a suction lock/release 3, which is used to peg onto deep scoops 221 through the action of a spring-controlled slider 31 installed in the suction lock/release 3, so as to set the lever 23 to a desired angle for suction lock. Also, the lever 23 has a recession 232 near the pivot joint to allow a shaft 233 to pass through the lever 23 and a recoil spring 4 assembled together with the lever 23, where the two ends of the recoil spring 4 are acted against the top part of the receptacle 21 and the lever 23 respectively to produce a upward rebound force to reset the lever 23 to the original position whenever the lever 23 is allow to free play.

The suction lock/release 3 is assembled inside the upper portion of the lever 23, wherein the suction lock/release 3 has a slider 31 in the inner space 234 of the lever 23, assembled with a small spring 32, and partially covered by a slat 235. The slider 31 is double pronged having a peg 311 on each one of the two arms that are to act against deep scoops 221 to lock the lever 23 at a fixed angle. The slider 31 has a handle 312, such that the user is able to move the slider 31 forward and backward through an opening 237 to set the pegs 311 apart from the deep scoop 221, thus releasing the suction cup 1 from the holding surface.

Figure 3B:
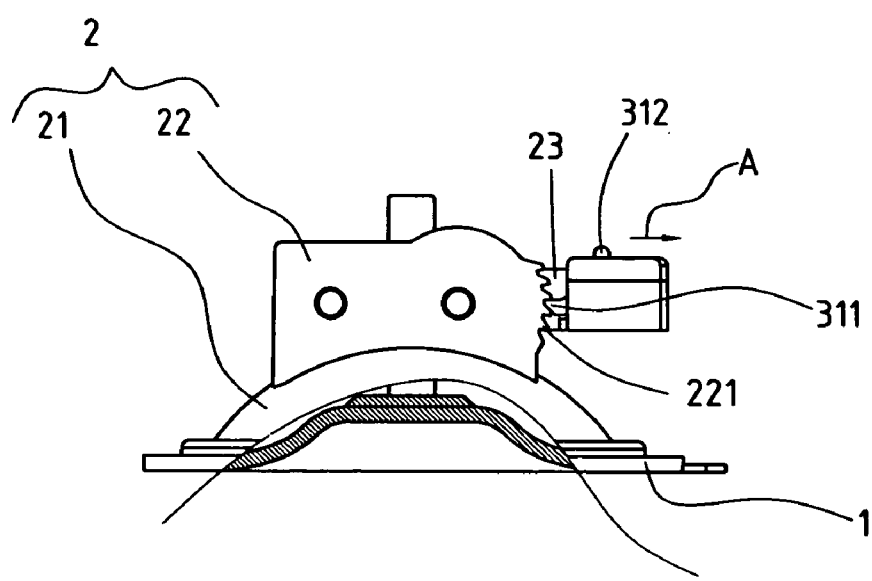
FIG. 3B is another sectional view of the action of the adjustment lever to adjust the suction strength in accordance with the present invention.

Through FIGS. 3A and 3B, the action of the lever 23 to adjust the suction strength of the vacuum suction apparatus is fully illustrated. When the vacuum suction apparatus is applied on a glass or other smooth surface, the suction cup 1 is first placed squarely over the holding surface, and then the receptacle 21 is pressed down toward the surface for a firm grip on the holding surface, and then the lever 23 is cranked in the downward direction, wherein the force through the pinion 231 and the rack 11 is translated to an upward pulling force on the central portion of the suction cup 1 as shown in FIG. 3B, thus air is drawn out from the enclosed space of the suction cup 1 to produce a suction force forcing two surfaces to stick together, and at this time the handle 312 is pushed down to force the two pegs 311 of the slider 31 to lock onto deep scoops 221 of the cogwheel 22 to lock the lever 23 in fixed angle.

When removing the vacuum suction apparatus, the handle 312 is pushed upward, allowing the recoil spring 4 of the lever 23 to free play and bring the lever 23 back to the original position, so that the central part of the suction cup 1 is depressed, thus releasing the suction cup 1 from the holding surface.

From the foregoing, the adjustment angle of the lever 23 can be changed or reset by the action of the slider 31 to peg onto the deep scoops 221 of the cogwheel 22, that is to say the suction strength of the vacuum suction apparatus can be desirably adjusted by setting the angle of the lever 23 to counter the wearing down of elasticity over extended use of the vacuum suction apparatus, so as to continuously hold onto the same spot. To prolong the effective product life of the vacuum suction apparatus, the adjustment lever can be set to a small angle initially, and as time progresses the adjustment angle can be gradually increased in order to produce increased suction strength to counter the wearing down of elasticity over extended use of the vacuum suction apparatus.

Figure 4:
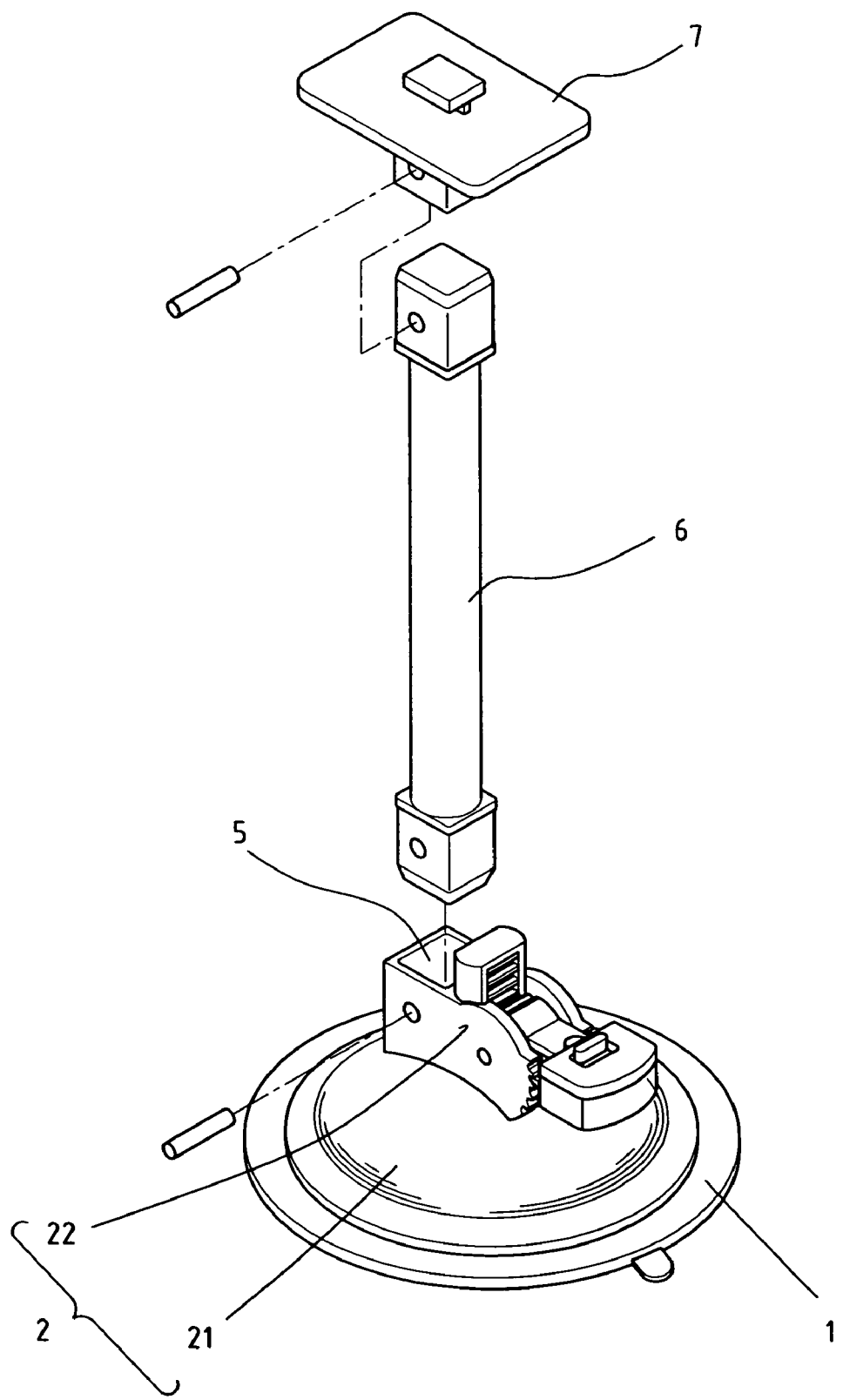
FIG. 4 is another preferred embodiment of the invention.
Figure 5:
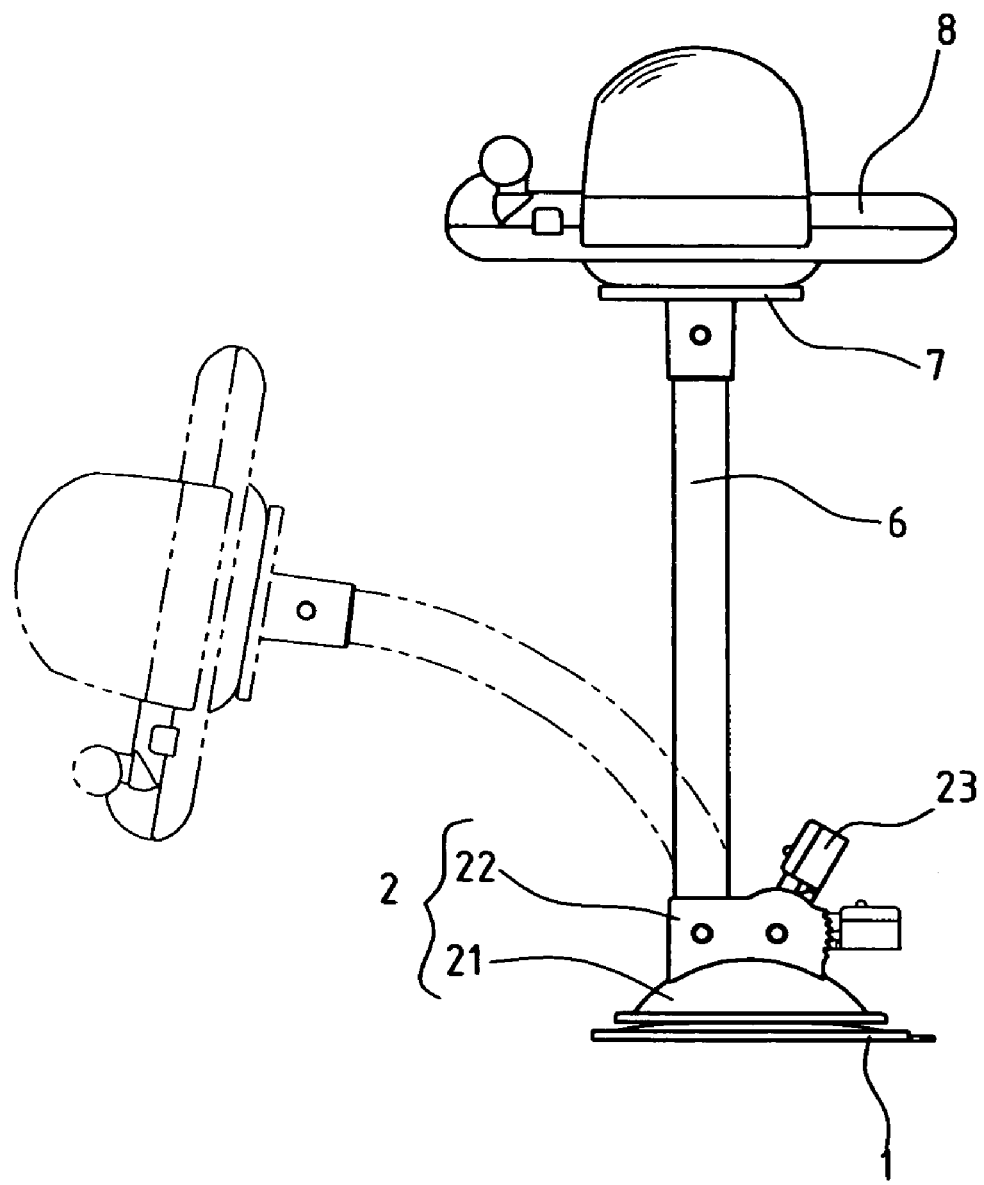
FIG. 5 is a user application diagram of the preferred embodiment.

Referring to FIG. 4, another preferred embodiment of the invention is shown, in which the cogwheel 22 has an extra insertion slot 5 over the wheel base 2 to receive a pole 6 vertically through the cogwheel 22 to reach the wheel base 2. The pole 6 is made of flexible metal, such as aluminum or copper, and the external surface is coated with a layer of PVC or rubber material, so that the pole 5 can be bent but still possesses the rigidity for firmly mounting the vacuum suction apparatus at an angle, as shown in FIG. 5. The pole 6 is attached to a frame 7 and an anchoring means 8 which is used to mount an electronic device such as a mobile phone or a PDA in an automobile.

Using the vacuum suction apparatus, in accordance with the present invention, an electronic device can be adhered onto the windshield glass and adjusted for viewing angle, so that the driver can watch the display screen effortlessly. The driver's vision will not be distracted during driving, where the conventional holders are often installed below the dash board of the automobile, so the drivers often have to strain the neck to watch the display screen of the electronic device. In addition, the vacuum suction apparatus can be further adjusted by bending the pole 6 to achieve even better viewing angle for the driver.

Although the present invention has been described with reference to the preferred embodiments thereof, it is apparent to those skilled in the art that a variety of modifications and changes may be made without departing from the scope of the present invention which is intended to be defined by the appended claims.

What is claimed is:
1. A vacuum suction apparatus, comprising
a suction cup having a rack erected vertically from the center; and
a wheel base having a circular shaped receptacle being attached to the suction cup from underneath, a cogwheel being fixed on top of the receptacle, and a lever being pivotally connected to the cogwheel through an opening in the cogwheel, wherein the receptacle also has a corresponding opening at the center to allow the rack to pass through vertically to the outside, also passing through the opening of the cogwheel used to hold the lever; the lever has a pinion on the bottom end to lock against the rack linked to the suction cup; and the cogwheel has multiple deep scoops on the outer edges of two lateral walls thereof, which are pegged against by the action of a slider to lock or release the lever.

2. The vacuum suction apparatus as claimed in claim 1, wherein the slider is assembled in an inner space in the upper portion of the lever, partially covered by a slat, having a small spring for control and two pegs on two respective arms to peg against deep scoops on the outer edges of the cogwheel when the lever is in locked position, and the slider also has a handle on the upper portion for manual control of the slider action.

3. The vacuum suction apparatus as claimed in claim 1, wherein lever is pivotally connected to the cogwheel and assembled with a recoil spring on one side.

4. The vacuum suction apparatus as claimed in claim 1, wherein the cogwheel over the wheel base has an insertion slot on one side.

5. The vacuum suction apparatus as claimed in claim 4, wherein the insertion slot is to receive a flexible pole, one end of which is connected by a frame and an anchoring means for firmly mounting the vacuum suction apparatus at an angle.

6. The vacuum suction apparatus as claimed in claim 5, wherein the flexible pole is made with flexible metal and the surface is coated with a layer of PVC or rubber materials.

* * * * *